United States Patent [19]

Funada

[11] Patent Number: 5,424,852
[45] Date of Patent: Jun. 13, 1995

[54] IMAGE PROCESSING APPARATUS

[75] Inventor: Masahiro Funada, Yokohama, Japan

[73] Assignee: Canon Kabushiki Kaisha, Tokyo, Japan

[21] Appl. No.: 37,642

[22] Filed: Mar. 26, 1993

[30] Foreign Application Priority Data

Mar. 31, 1992 [JP] Japan .................... 4-076514

[51] Int. Cl.⁶ .............................. H04N 1/40
[52] U.S. Cl. ............................. 358/448
[58] Field of Search .......... 358/448, 406, 443, 445, 358/447, 446, 452, 105; 382/7

[56] References Cited

U.S. PATENT DOCUMENTS

| 4,270,143 | 5/1981 | Morris | 358/105 |
| 4,807,027 | 2/1989 | Muto | 358/105 |
| 5,050,224 | 9/1991 | Mori | 382/34 |
| 5,055,834 | 10/1991 | Chiba | 382/7 |
| 5,193,121 | 3/1993 | Elischer et al. | 382/7 |

FOREIGN PATENT DOCUMENTS

| 0342060 | 11/1989 | European Pat. Off. | G03G 21/00 |
| 0506479 | 9/1992 | European Pat. Off. | G03G 21/00 |
| 4016707 | 1/1992 | Japan | H04N 7/18 |

Primary Examiner—Stephen Brinich
Assistant Examiner—Jerome Grant, II
Attorney, Agent, or Firm—Fitzpatrick, Cella, Harper & Scinto

[57] ABSTRACT

An image processing apparatus judges the degree of similarity between entered image data and characterizing data of a special image (an image containing a special original such as a bank note or negotiable instrument) prepared in advance, generates data indicative of the degree of similarity and integrates similarity data in two-dimensional space while subjecting the entered image data to image processing conforming to the results of integration. For example, image data of an area for which the degree of similarity resulting from integration indicates a certain value is forcibly converted into data having maximum density.

11 Claims, 23 Drawing Sheets

FIG. 4

| CNO SIGNAL | PRINTER OUTPUT |
|---|---|
| 0 | MAGENTA (M) |
| 1 | CYAN (C) |
| 2 | YELLOW (Y) |
| 3 | BLACK (Bk) |

IMAGE PROCESSING APPARATUS

BACKGROUND OF THE INVENTION

1. Field of the Invention

This invention relates to an image processing apparatus having a function for detecting a special image in an image that has been read. The term "special image" refers to an image such as a bank note or negotiable instrument and so on.

2. Related Art

Recent improvements in the picture quality of copying machines which now have a color capability have been accompanied by the fear of counterfeiting of special originals not meant to be copied. Accordingly, techniques have been proposed which make it possible for the image processor incorporated in such copying machines to recognize a bank note or negotiable instrument itself or an original that contains a special image of this kind (such an original shall be referred to as a "mixed original" below). For example, an apparatus has been proposed in which data characterizing the special image is stored internally in advance, the characterizing data is compared with the characteristics of the entered image signal and it is determined, based upon the result of the comparison, whether the special image is present in the original image.

With this approach, a judgment is made with regard to the degree of similarity between the image data of the mixed original and the image data of the special image, and the data constituting the result of the judgment is subjected to integration in one direction using an integrator in order to eliminate noise.

A drawback encountered in this technique is that since the direction of integration is fixed, as mentioned above, the results of judgment differ depending upon the direction in which the mixed original is read or the orientation of the original.

SUMMARY OF THE INVENTION

An object of the present invention is to provide an image processing apparatus in which it is possible to execute judgment processing without the results of judgment regarding a special original being affected by the direction or orientation of an entered image.

According to the present invention, the foregoing object is attained by providing an image processing apparatus comprising judging means for judging degree of similarity between entered image data and characterizing data of a special original prepared in advance, integrating means for integrating, in two-dimensional space, data indicative of the degree of similarity outputted by the judging means, and image processing means for processing the entered image data in accordance with the result obtained by the integrating means.

In accordance with this arrangement, data indicative of the degree of similarity is integrated over two-dimensional space. Accordingly, the continuity of the data representing degree of similarity is stressed, as a result of which noise components are eliminated to raise the accuracy with which special images are recognized.

Another object of the invention is to provide an image processing apparatus having integrating means that employs an impulse-response filter.

Yet another object of the invention is to provide an image processing apparatus having integrating means that employs an infinite impulse-response filter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram for describing modes indicated by a signal CNO;

DESCRIPTION OF THE PREFERRED EMBODIMENTS

The present invention will now be described in detail with regard to two preferred embodiments (first and second embodiments) while referring to the accompanying drawings. In these embodiments, a color copying machine will be illustrated as an example of application of the invention. Accordingly, components common to the first and second embodiments of the color copying machine will be described first, then two examples (first and second embodiments) of a discriminating circuit, which especially embodies the features of the present invention, of the copying machine will be described.

It should be noted that the application of the image processing apparatus of the present invention is not limited to the foregoing. The invention can of course be applied to various other apparatus and systems.

Overview Of Apparatus

Figure 2:
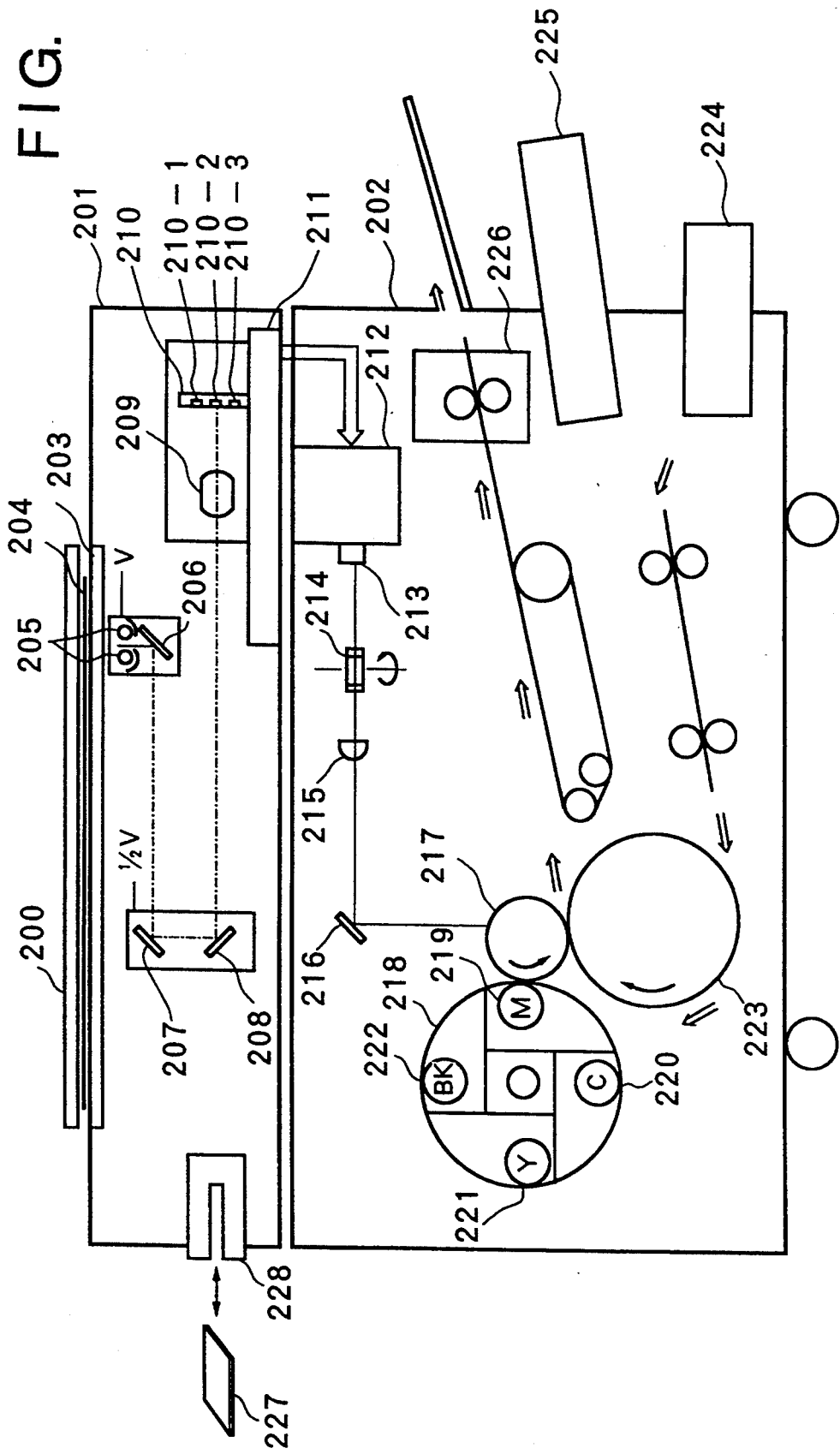
FIG. 2 is a side sectional view showing the construction of a copying machine incorporating the image processing apparatus according to a first or second embodiment of the present invention.

FIG. 2 is a side sectional view showing the construction of a copying machine according to an embodiment of the present invention. In FIG. 2, numeral 201 denotes an image scanner for reading a mixed original (hereinafter referred to simply as an "original") and performing digital signal processing. Numeral 202 designates a printer for printing out an image, which corresponds to the original image read by the image scanner 201, on recording paper in full color. Numeral 200 denotes a pressure plate, which is finished to a mirror surface, for pressing down the original to be read.

The image scanner 201 includes a glass platen 203 and a lamp 205 for irradiating an original 204 placed upon the platen 203. The image of the original is introduced to mirrors 206, 207, 208 and an image is formed on a three-line sensor (hereinafter referred to as a "CCD") 210 by a lens 209. The CCD 210 sends the image of the original to an image processor 211 as red (R), green (G) and blue (B) component signals, which represent full-color information. The entire surface of the original is scanned (sub-scanning) by mechanically moving the lamp 205 and mirror 206 at a velocity V as well as the mirrors 207, 208 at a velocity V/2 in a direction perpendicular to the electrical scanning direction (main-scan direction) of the CCD 210.

The signal processor 211 electrically processes the read image signal, separates the signal into magenta (M), cyan (C), yellow (Y) and black (Bk) components and sends these components to the printer 202. At least one component among the M, C, Y, Bk components is sent to the printer 202 per scan of the original in the image scanner 201, and a printout in a single color is completed by a total of four scans of the original.

The M, C, Y, Bk image signals successively received from the image scanner 201 are sent to a laser driver 212. The laser driver 212 modulates and drives a semiconductor laser 213 in dependence upon the image signal sent. The laser light emitted by the semiconductor laser 213 is made to scan across a photosensitive drum 217 via a polygon mirror 214, an f-θ lens 215 and a mirror 216, thereby forming an electrostatic latent image.

Numeral 218 denotes a revolving developer comprising a magenta developing section 219, a cyan developing section 220, a yellow developing section 221 and a black developing section 222. These four developers come into alternate contact with the photosensitive drum 217 so that the electrostatic latent image formed on the photosensitive drum 217 is developed by means of toners.

Numeral 223 denotes a transfer drum upon which recording paper fed from a paper cassette 224 or 225 is wound so that the image developed on the photosensitive drum 217 may be transferred to the recording paper.

After the four colors M, C, Y, Bk have thus been transferred successively, the recording paper is passed through a fixing unit 226 to fix the toners on the paper, after which the paper is ejected.

Numeral 227 denotes an IC card. When the IC card 227 is inserted in a card reader 228 incorporated in the image scanner 201, the reader 228 reads the IC card and transfers information, which has been stored on the IC card 227, to the image processing apparatus proper. As will be described later, the reader 228 is used when there is a change in the characterizing data of a special original that has been stored in the image processing apparatus.

Image Scanner

Figure 3:
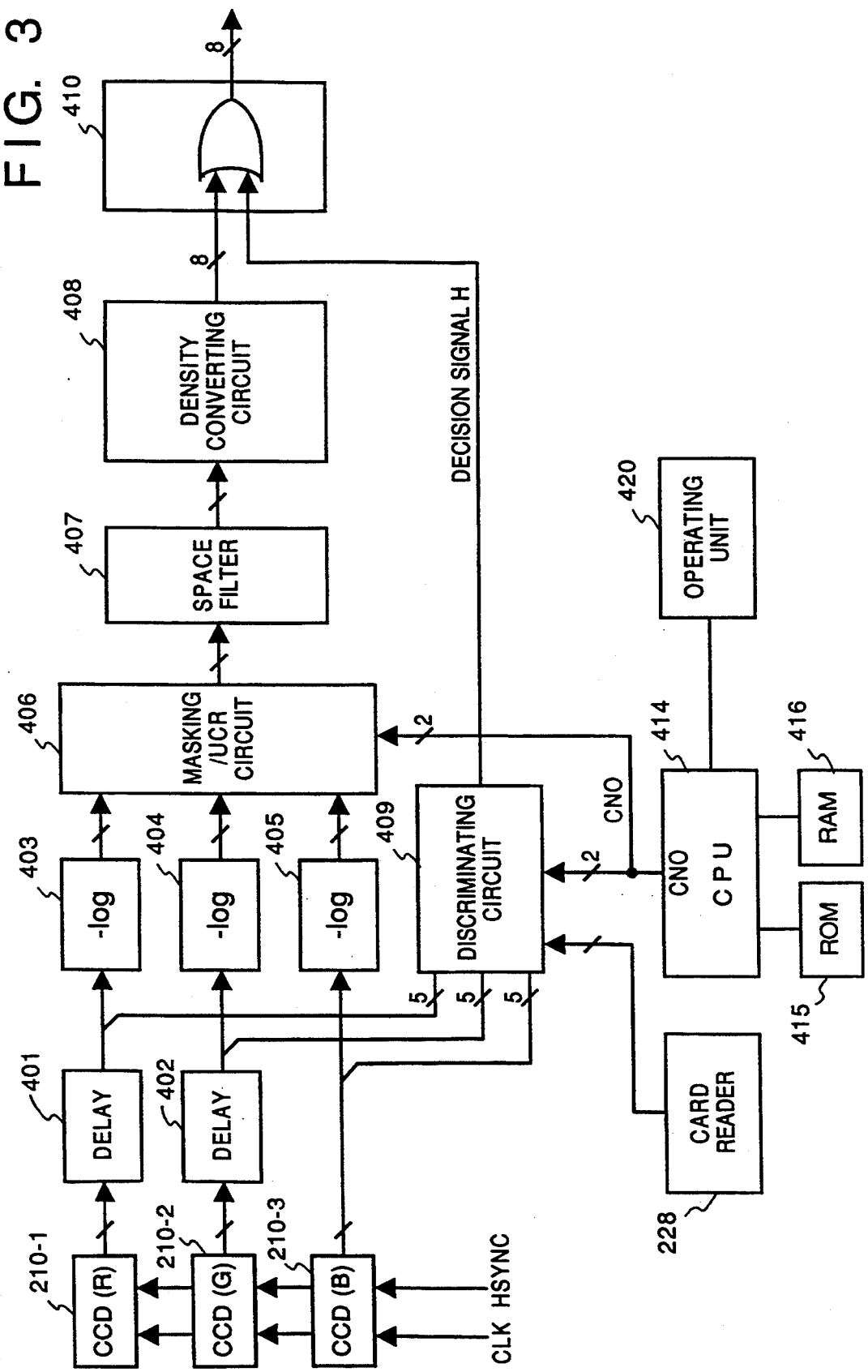
FIG. 3 is a block diagram showing the configuration of an image scanner in the copying machine of FIG. 2.

FIG. 3 is a block diagram showing the construction of the image processing system of the image scanner 201.

Numerals 210-1, 210-2, 210-3 in FIG. 3 denote CCD sensors (solid-state image sensing devices) having spectral sensitivity characteristics for red (R), green (G) and blue (B), respectively. Each of these CCD sensors produces an eight-bit (0~255) output signal that has been subjected to an A/D conversion.

The CCD sensors 210-1, 210-2, 210-3 used in this embodiment are arranged so as to be spaced apart a fixed distance. Delay elements 401 and 402 correct for a time delay in the R, G, B signals that results from a displacement in terms of time.

Numerals 403, 404, 405 denote log converters, each of which is constituted by a look-up table ROM or RAM. The R, G, B signals, which have been corrected in terms of time, are converted from luminance signals to density signals by these log converters. Numeral 406 denotes a well-known masking/UCR (undercolor removal) circuit. The masking/UCR circuit 406 generates each of the magenta (M), cyan (C), yellow (Y) and black (Bk) signals at a prescribed bit length (eight bits) from the three entered signals (R, G, B).

Numeral 407 denotes a well-known space filter circuit that corrects the space-frequency components of the output signals (M, C, Y, Bk). Numeral 408 denotes a density converting circuit for correcting the density characteristic of the printer 202. Like the log converters 403~405, this circuit is constituted by a ROM or RAM.

Numeral 414 denotes a microcomputer (hereinafter referred to as a "CPU") that performs overall control of the apparatus. Numeral 415 denotes a ROM storing the program that operates the CPU 414, and 416 a RAM used as a work area for executing various programs.

Figure 14:
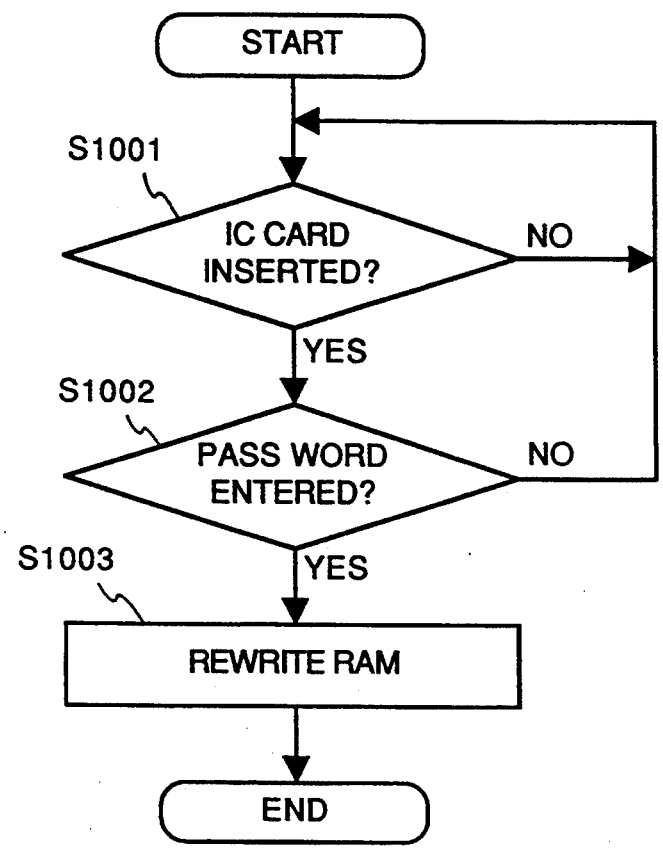
FIG. 14 is a flowchart for describing the rewriting procedure of a color-shade matching LUT.

A signal CNO outputted by the CPU 414 is a two-bit control signal that controls the order of the four reading operations for the output colors magenta (M), cyan (C), yellow (Y) and black (Bk). FIG. 14 is a diagram illustrating the relationship between the CNO signal and printed outputs. In this copying machine, the CNO signal takes on the values of 0~3, in which 0, 1, 2 and 3 represent magenta, cyan, yellow and black, respectively. The CNO signal is used in order to change over the operating conditions of the masking/UCR circuit 406.

Figure 5:
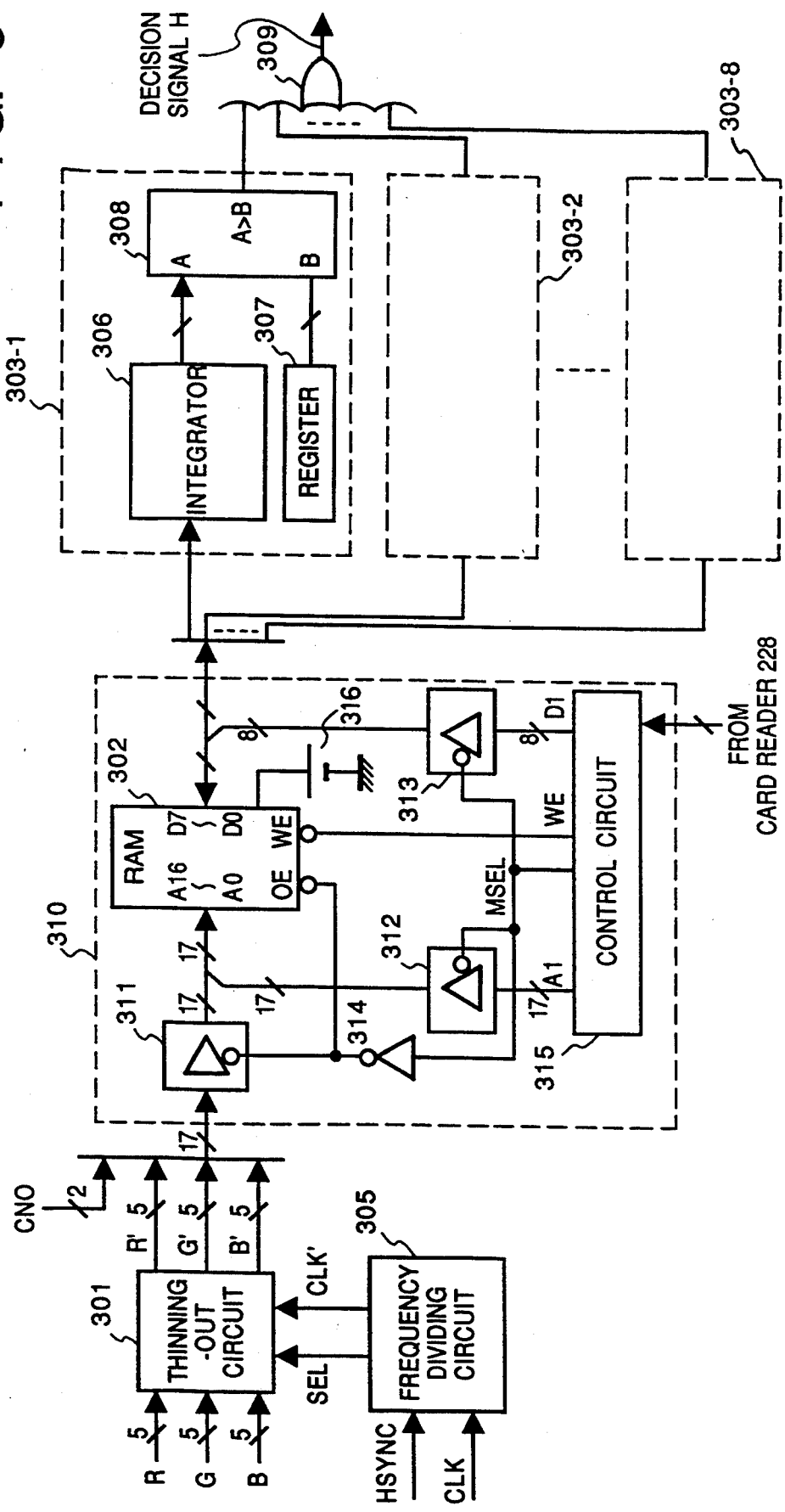
FIG. 5 is a block diagram showing the configuration of a discriminating circuit according to the first embodiment.

Numeral 409 denotes a discriminating circuit for judging whether a mixed original contains the so-called "special original", such as a bank note or negotiable instrument. When one pixel of image data in a mixed original that has been read is subjected to the aforementioned log conversion, masking/UCR processing (406), filter processing (407) and density-conversion processing (408) so that output data of one pixel (eight bits) is delivered by the converting circuit 408, the discriminating circuit 409 outputs a one-bit decision signal H, which indicates the result of judgment as to whether the pixel being outputted is one contained in a special original. More specifically, when it has been determined that the pixel being outputted is contained in at least one type of a plurality of types of special originals decided in advance, the signal H outputted is at logical "1"; otherwise, H=0 is outputted. Further, as shown in FIG. 5, the discriminating circuit 409 includes a thinning-out circuit 301 and a frequency dividing circuit 305, which cooperate to thin out the R, G, B signals that have been corrected for the delay. To this end, the CNO signal, which is a field-sequential signal, is applied to the discriminating circuit 409. The discriminating circuit 409 is capable of discriminating different special originals by changing over criteria in accordance with the CNO signal with regard to each of the four reading operations.

Numeral 410 in FIG. 3 represents an OR gate for taking the OR between the decision signal H, which is the output of the discriminating circuit 409, and each bit of the eight-bit output V of the density converting circuit 408, and outputting V' as the result of the AND operation. When the decision signal H is logical "1", namely when it is judged that a special original is being read by the scanner 201 of the copying machine, the OR gate 410 outputs $V' = FF_H$ (255 when written as a decimal number) irrespective of the value of the input signal V. When the decision signal H is logical "0", namely when it is judged that a special original is not being read, the value of the input signal V is outputted without change as the output V'.

As shown in FIG. 3, the output of the card reader 228 is sent to the discriminating circuit 409. Accordingly, the judging conditions or criteria in the discriminating circuit 409 can be changed by the information from the card reader 228.

Numeral 420 in FIG. 3 denotes an operating unit having keys and a liquid-crystal display used when performing a copying operation. The operating unit 420 will be described later in association with an operation that updates data for judging special originals in the discriminating circuit 409.

<Discriminating Circuit> First Embodiment

FIG. 5 is a block diagram showing the configuration of the discriminating circuit 409 according to the first embodiment.

As shown in FIG. 5, the discriminating circuit 409 comprises the thinning-out circuit 301, the frequency dividing circuit 305, a color-shade matching circuit 310, a plurality of color-shade judging circuits 303 and an OR gate 309. The thinning-out circuit 301 thins out some of the data from the entered RGB data in order to lighten the processing load on the discriminating circuit 409.

The color-shade matching circuit 310 comprises a color-shade matching look-up table RAM (hereinafter referred to as a "color-shade matching LUT") 302,-tri-state gates 311, 312, 313, an inverter 314, a control circuit 315 and a battery 316 for preserving the content of the RAM 302 irrespective of the on/off state of the apparatus power supply.

The color-shade matching LUT 302 stores 32 types of data for matching purposes. This data, referred to as "matching data", is stored in the LUT 302 in advance The matching data is obtained by examining the 32 types of special originals, specifically the distribution of each of the color shades thereof. The address inputs to the matching LUT 302 are 15 bits of the RGB signals and the two bits of the CNO signal, for a total of 17 bits. The LUT 302 outputs, as an eight-bit signal, a decision as to whether the color shade of an entered pixel (17 bits) agrees with a color shade that has been registered in advance. The information within the color-shade matching LUT 302 is preserved by virtue of the battery 316 even if the power supply of the apparatus is turned off.

The control circuit 315 outputs a mode-select (hereinafter referred to as "MSEL") signal and a write-enable (hereinafter referred to as "WE") signal as the control signals, thereby controlling the read/write operation of the color-shade matching LUT 302 as well as the-states of the tri-state gates 311, 312, 313. The control circuit 315 has two control modes, namely (1) an ordinary control mode in which the RAM 302 operates as a look-up table, and (2) a RAM rewrite control mode for rewriting the RAM 302.

In the ordinary control mode, the control circuit 315 fixes the MSEL signal at logical "1" thereby enabling the tri-state gate 311 and disabling the tri-state gates 312, 313 so that an output-enable (hereinafter referred to as "OE") terminal of the RAM 302 is made logical "0". Furthermore, the control circuit 315 fixes the WE signal at logical "0", thereby enabling the data output of the color-shade matching LUT 302 so that the LUT 302 acts as a look-up table.

Numerals $303_{-1}, 303_{-2}, \ldots, 303_{-8}$ denote the color-shade judging circuits, each of which is composed of identical hardware. Specifically, each circuit includes an integrator 306 shown in FIG. 5, a register 307 and a comparator 308. These circuits each judge whether a special image is contained in an input original. That is, the eight judging circuits $303_{-1}, 303_{-2}, \ldots, 303_{-8}$ judge one output (composed of eight bits) from the RAM 302. As mentioned earlier, the two bits of the screen-sequential signal CNO enter the two higher order address bits of the color-matching LUT 302, and the five higher order bits of each of the image signals of colors R, G, B enter the 15 lower order address bits of the LUT 302. The values 0, 1, 2, 3 of the CNO signal correspond to the colors M, C, Y, Bk, respectively. Accordingly, as the value of the signal CNO varies over the range 0~3, the judging circuits ($303_{-1} \sim 303_{-8}$) judge whether the color shade of an input pixel represented by 15 bits agrees with the color shade in eight types of special originals. Therefore, when the value of the signal CNO varies over the range 0~3 with regard to one input original, a total of 32 types of special originals will be judged in four reading scans.

Numeral 309 in FIG. 5 denotes an OR gate that outputs "1" as the decision signal H if a special original is judged to be present based on one or more outputs from the color-shade judging circuits $303_{-1}, 303_{-2}, \ldots, 303_{-8}$. If it is judged that a special original is not contained in the original image, then the OR gate 309 outputs "0" as the decision signal H.

Figure 6:
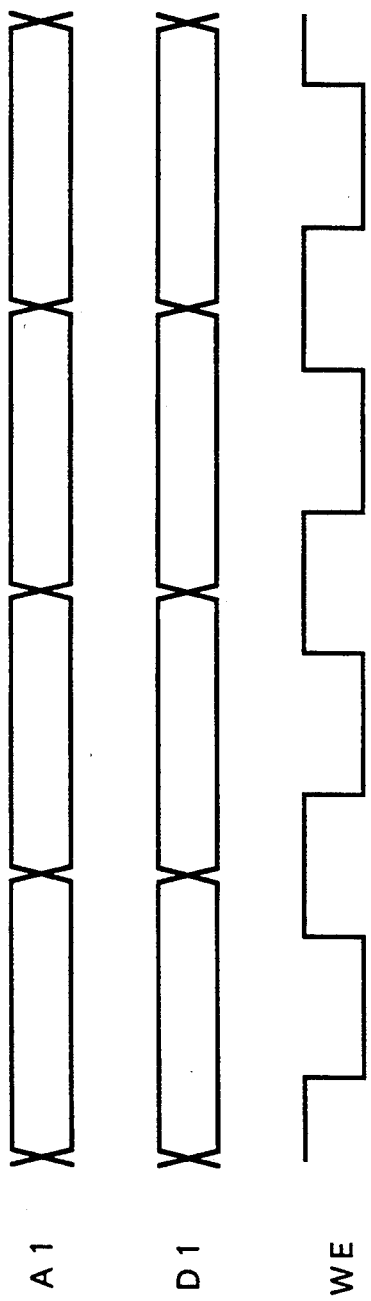
FIG. 6 is an operation timing chart showing signals associated with a RAM rewrite control mode.

In the RAM rewrite control mode, the control circuit 315 rewrites the color-shade matching LUT 302 based upon the data transferred from the card reader 228. More specifically, the control circuit 315 fixes the MSEL signal at logical "0", thereby disabling the tri-state gate 311 and enabling the tri-state gates 312, 313. Furthermore, in accordance with timing illustrated in FIG. 6, the control circuit 315 generates and outputs an A1 signal as the address of the LUT 302 via the gate 312, a D1 signal as rewrite data via the gate 313, and the WE signal, which enters the WE terminal of the LUT 302, whereby the information held by the RAM 302 can be rewritten. The timing chart of FIG. 6 illustrates the timing of the RAM rewrite control mode according to the first embodiment.

Once the information in the color-shade matching LUT 302 has been updated, the information is preserved by the battery 316 independently of the apparatus power supply. Thus, even if the apparatus power supply is turned off, the information is preserved until the next updating operation.

Thinning-Out Circuit and Frequency-Dividing Circuit

Figure 7:
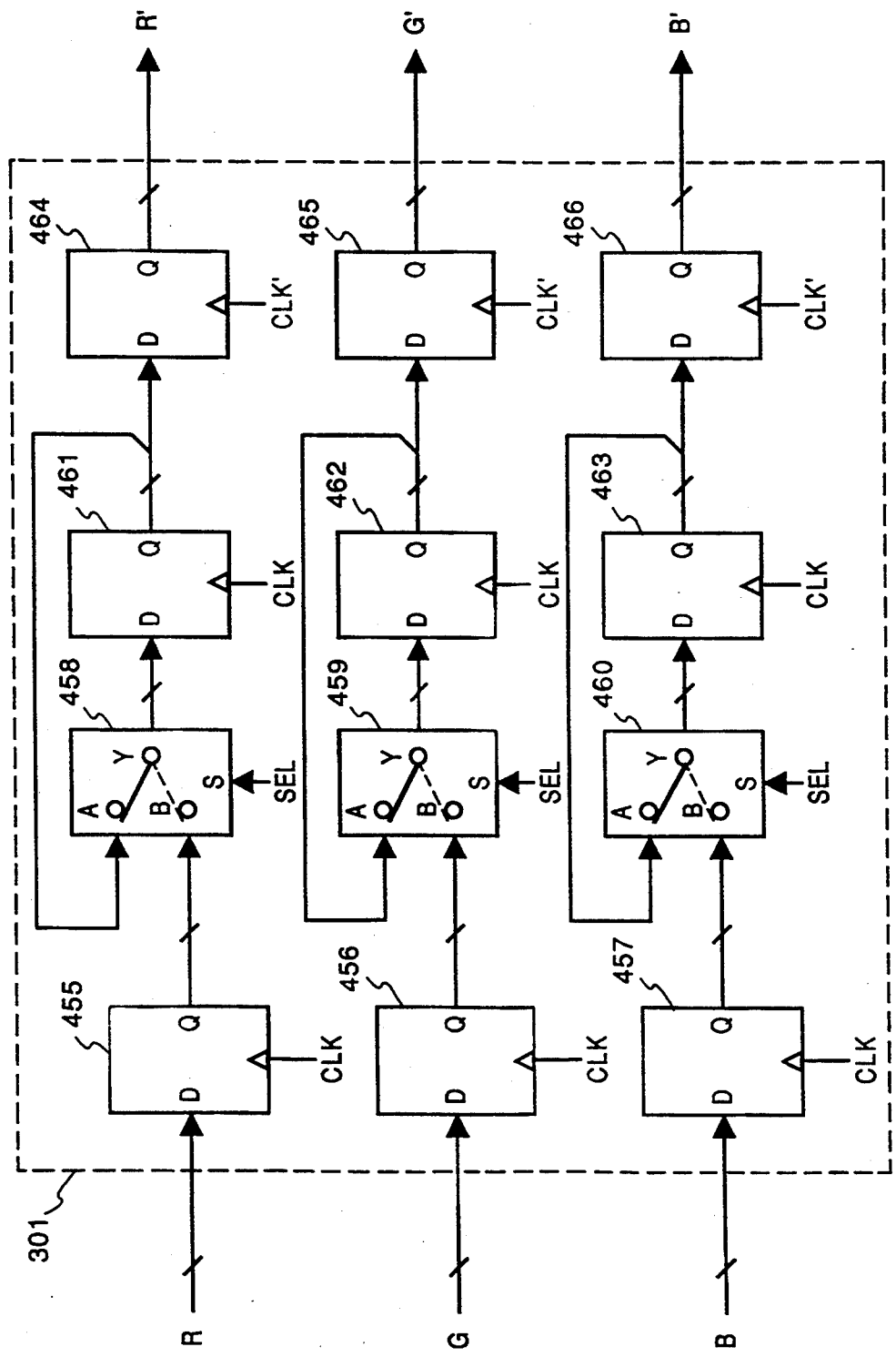
FIG. 7 is a block diagram showing the configuration of a thinning-out circuit.
Figure 8:
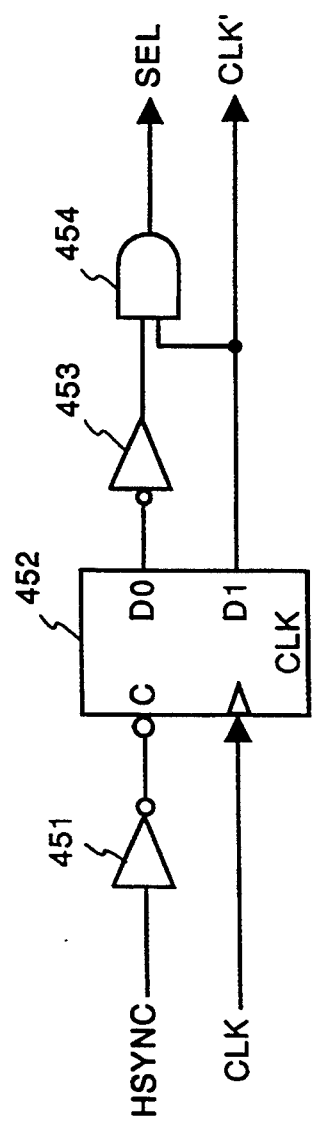
FIG. 8 is a block diagram showing the configuration of a frequency dividing circuit.
Figure 9:
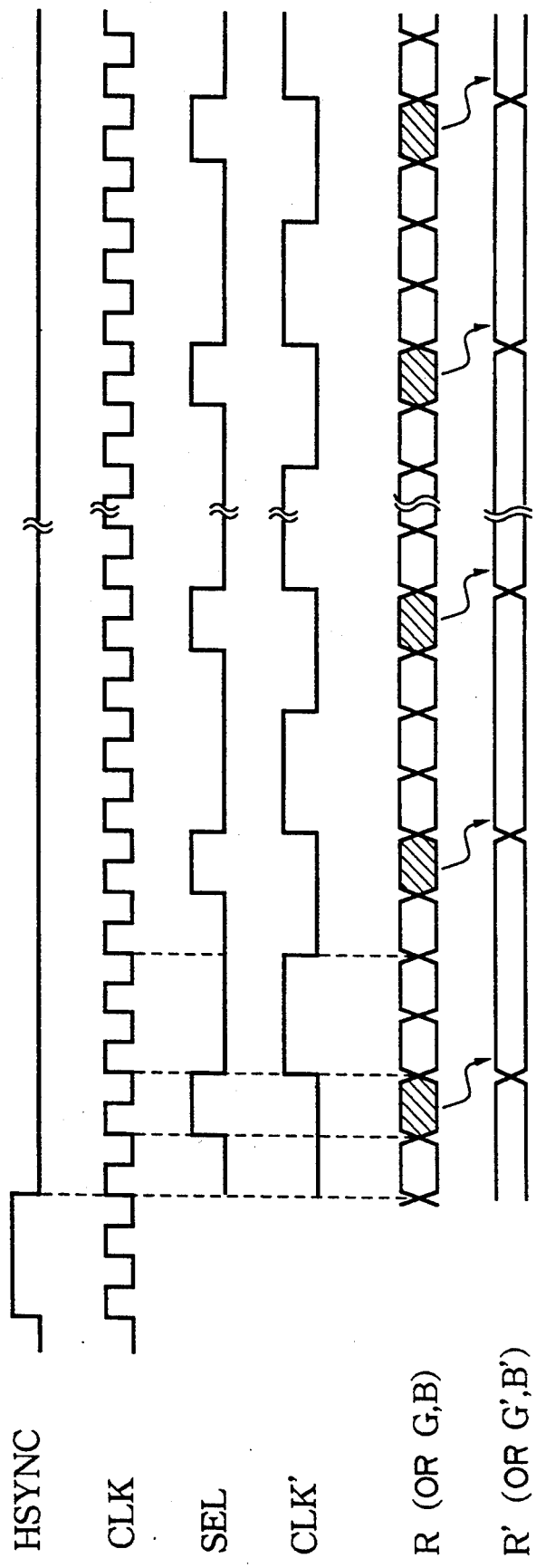
FIG. 9 is an operation timing chart associated with a main-scan direction in an ordinary control mode according to the first embodiment.

FIG. 7 is a block diagram showing the configuration of the thinning-out circuit 301 according to the first embodiment, FIG. 8 is a block diagram showing the configuration of the frequency dividing circuit 305 according to the first embodiment, and FIG. 9 is an operation timing chart associated with the main-scanning direction in the ordinary control mode according to the first embodiment.

In FIG. 9, HSYNC represents a main-scan synchronizing signal for achieving synchronization with the start of main scanning. CLK is an image transfer clock which, in this embodiment, is the basic clock of a variety of image processing operations. CLK', which represents a clock obtained by frequency division of the CLK signal by four, serves as the basic clock in the discriminating circuit 409. A select (hereinafter referred to as "SEL") signal is a timing signal used in the thinning-out circuit 301. CLK' and SEL are produced by the frequency dividing circuit shown in FIG. 8.

As shown in FIG. 7, the thinning-out circuit 301 comprises flip-flops 455~457, 461~466 and selectors 458~460. In FIG. 8, the frequency divider circuit 305 is constituted by an inverter 451, a two-bit counter 452, an inverter 453 and an AND gate 454. The flip-flops 455~457, 461~463 and selectors 458~460 hold data at the timing of CLK, and the flip-flops 464~466 hold data at the timing of CLK'.

After being cleared (initialized) by the HSYNC signal, which is the main-scan synchronizing signal, the two-bit counter 452 in the frequency dividing circuit 305 counts the CLK signal and outputs the counted value in the form of two bits (D0, D1). The higher order bit D1 is outputted as the CLK' signal, and the result of taking the AND between the higher order bit D1 and a signal obtained by inverting the lower order bit D0 of the counter is outputted as the SEL signal.

As a result, in the thinning-out circuit 301, the R (or G, B) signal transferred by the CLK signal is thinned out at a ratio of ¼, and an R' (or G', B') signal synchronized to CLK' can be obtained, as shown in FIG. 9.

Integrator

Figure 1:
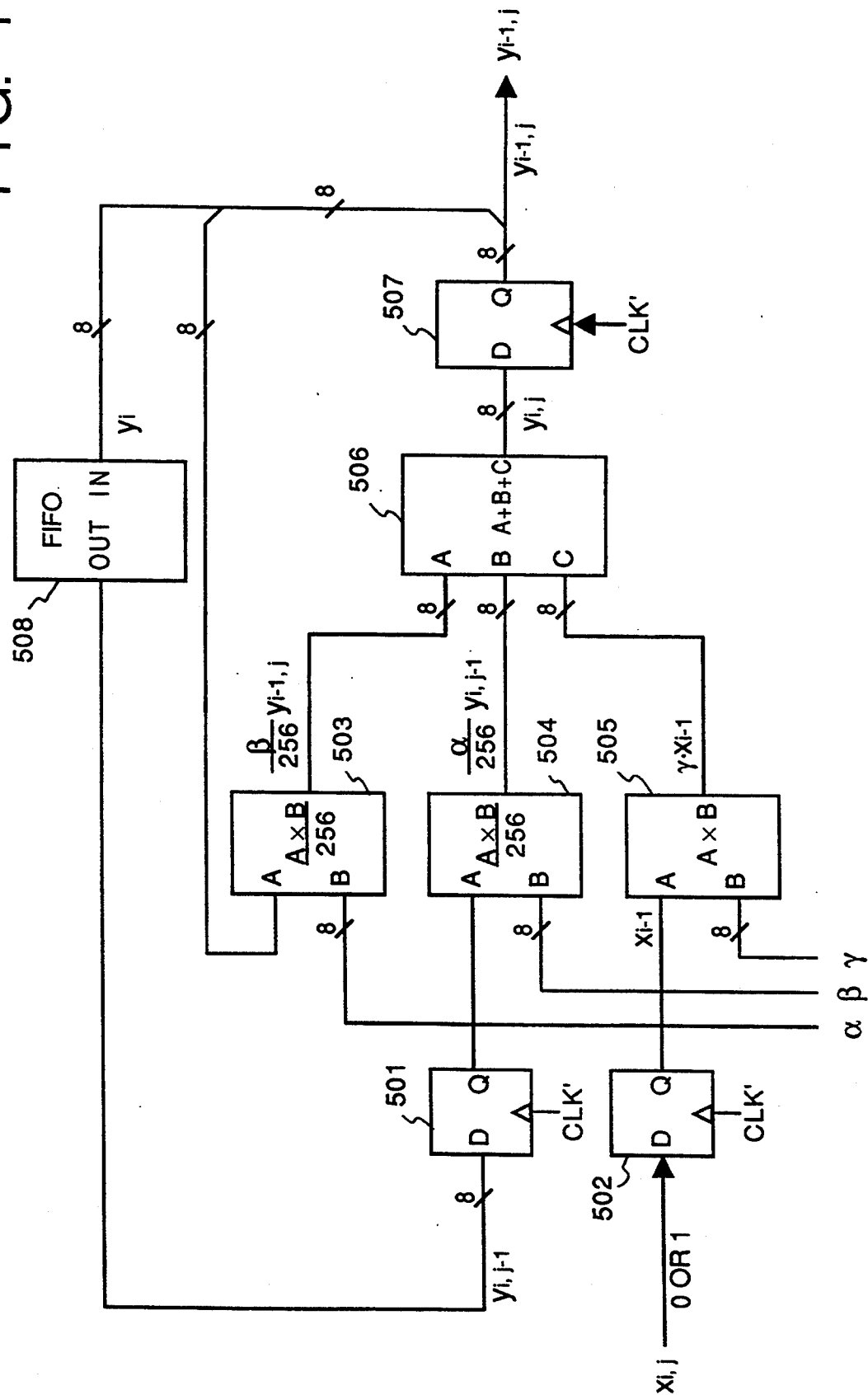
FIG. 1 is a block diagram showing the configuration of an integrator according to a first embodiment of the present invention.
Figure 10:
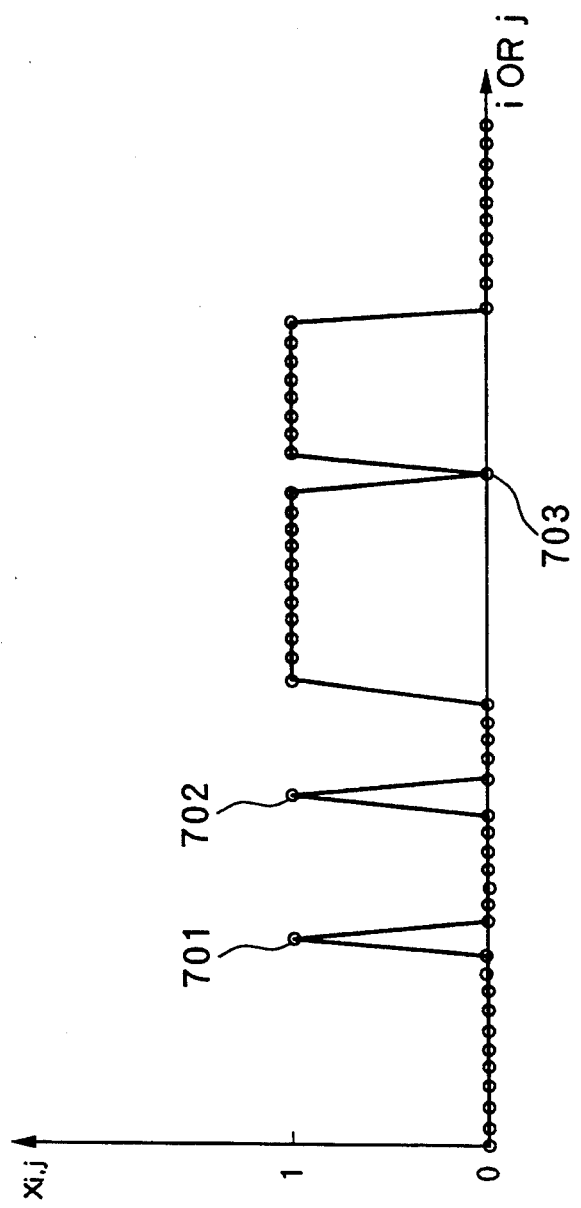
FIG. 10 is a diagram showing an example of input/output of the integrator depicted in FIG. 1.
Figure 11:
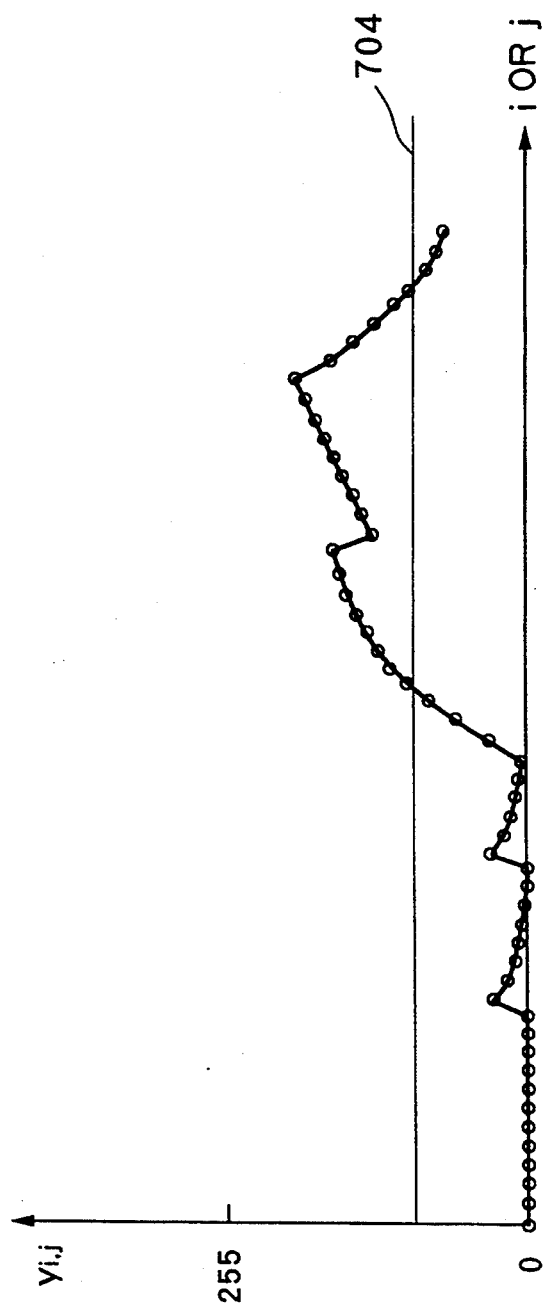
FIG. 11 is a diagram showing an example of input/output of the integrator depicted in FIG. 1.

FIG. 1 is a block diagram showing the configuration of the integrator according to the first embodiment. In this embodiment, the integrators shown in FIG. 5 are composed of identical hardware and therefore the integrator 306 will be described as being representative of these integrators. FIGS. 10 and 11 are diagrams showing examples of input/output of the integrator shown in FIG. 1.

The integrator 306 is for the purpose of two-dimensionally integrating the result $x_{i,j}$ (where i represents a main-scan coordinate and j a sub-scan coordinate) of the judgment made by the color-shade matching circuit 310, thereby eliminating noise from the result.

In FIG. 1, numerals 501, 502 and 507 denote flip-flops that hold data at the timing of the leading edge of the CLK' signal. Numerals 503, 504 denote multipliers to which two eight-bit signals are inputted (at terminals A, B). Each of the multipliers 503, 504 multiplies these signals together and outputs an eight-bit signal $$\left(\frac{A \times B}{256}\right)$$

as the result. Numeral 505 denotes a multiplier to which a one-bit input signal (A) and an eight-bit input signal (B) are applied. The multiplier 505 multiplies these signals together and outputs an eight-bit signal (A×B) as the result.

Numeral 506 denotes an adder to which three eight-bit signals are inputted (at terminals A, B, C). The adder 506 adds these signals together and outputs an eight-bit signal (A+B+C) as the result. This output signal enters an eight-bit latch 507. Numeral 508 denotes, say, a FIFO (first-in first-out) memory which, if n represents the number of pixels on one line, applies a delay of n−1 pixels and outputs $y_{i,j-1}$ when $y_{i-1,j}$ enters the FIFO memory.

The integrator of FIG. 1 is adapted so as to form a filter. More specifically, the output of the eight-bit latch 507 takes two paths. The output on one path is fed back to the adder 506 via the FIFO memory 508, the eight-bit latch 501 and the multiplier 504. The output on the other path is fed back to the adder 506 via the multiplier 503. That is, the filter output $y_{i-1,j}$ enters the A terminal of the adder 506 via the multiplier 503, and the filter input $x_{i,j}$ enters the B terminal of the adder 506. Therefore, the filter of FIG. 1 constructs a recursive-type IIR (infinite impulse response) filter with respect to the impulse input $x_{i,j}$. Further, the filter output $y_{i,j-1}$ of the preceding line enters the B terminal of the adder 506 via the FIFO memory 508. Accordingly, the filter of FIG. 1 acts as a two-dimensional IIR filter, namely an IIR filter for the directions i and j. The characteristic of the filter of FIG. 1 is expressed as follows:

$$Y_{i,j} = (\alpha/256) \cdot y_{i-1,j} + (\beta/256) y_{i,j-1} + \gamma \cdot x_{i-1,j} \quad (1)$$

where $\alpha$, $\beta$ and $\gamma$ represent constants that have been preset. These constants act as weighting coefficients. The various characteristics of the filter (integrator) of FIG. 1 are decided by the sizes of these values. That is, $\alpha$ decides the contribution of integration in the j direction (sub-scan direction), $\beta$ the contribution of integration in the i direction (main-scan direction), and $\gamma$ the contribution of the input data. For example, in a case where $\alpha=124$, $\beta=124$, $\gamma=8$ holds, an output $y_{i,j}$ of the kind shown in FIG. 11 is produced in response to an input $x_{i,j}$ of the kind shown in FIG. 10. Here i (main-scan position) or j (sub-scan position) is plotted along the horizontal axis. The horizontal axis indicates similar characteristics whether viewed from the main-scan cross section or sub-scan cross section. In other words, the input $x_{i,j}$ represents a two-dimensional input.

An impulse input "1" regardless of the fact that values on either side thereof are almost "0", as at points 701, 702, and an impulse input "0" regardless of the fact that values on either side thereof are almost "1", as at point 703, may be considered to be noise. When this is processed by the integrator 306 having the circuit arrangement illustrated in FIG. 1, an output $y_{i,j}$ of the kind shown in FIG. 11 is obtained.

In the discriminating circuit 409 shown in FIG. 5, the output $y_{i,j}$ from the integrator 306 and a threshold value, which has been stored beforehand in the register 307, are compared by the comparator 308. FIG. 11 illustrates the threshold value 704 of the register 307 and the output $y_{i,j}$ of the integrator 306. The comparator 306 uses the threshold value to binarize the output $y_i$ of the integrator 306, thereby making it possible to eliminate noise.

In other words, the integrator of FIG. 1 integrates the data, which is indicative of the result of judgment, in two directions, namely the main- and sub-scan directions. As a result, continuity of the results of judgment in the horizontal and vertical directions is stressed, and results of judgment that are not continuous in these two directions are eliminated as noise.

Results of Processing

Figure 12:
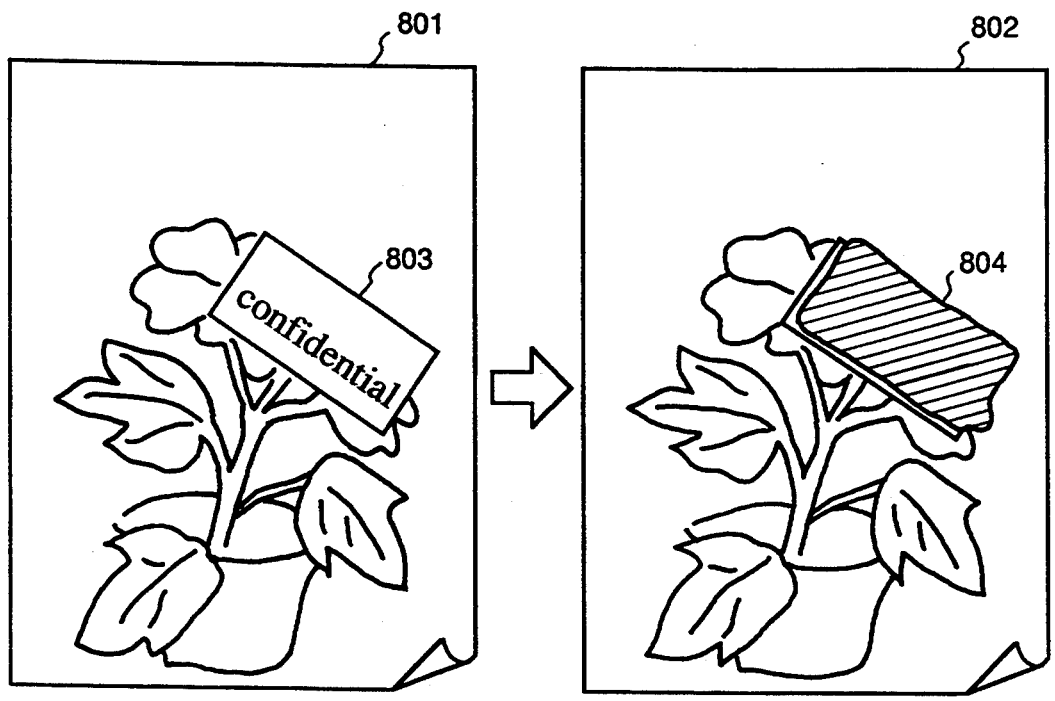
FIG. 12 is a diagram showing an example of results of copying according to the first embodiment.

FIG. 12 is a diagram showing an example of the results of copying according to the first embodiment. In FIG. 12, numeral 801 denotes an example of a mixed original. A part of this original contains a special original 803 to be discriminated by the apparatus of the invention. If the original 801 containing the special original 803 is copied, an outputted result of the kind shown at numeral 802 is obtained. In the result 802, the portion corresponding to the special original 803 becomes a masked image 804. For example, the masked image 804 is formed in the color magenta (M) when CNO=0 holds, the color cyan (C) when CNO=1 holds, the color yellow (Y) when CNO=2 holds and the color black (Bk) when CNO=3 holds. As a result, the portion corresponding to the special original 803 cannot be copied normally.

RAM Data Updating Procedure

The data in the color-shade matching LUT 302 should not be readily modifiable in nature. If anyone were capable of modifying the data in the LUT at will, this might make it possible for the apparatus to be used unlawfully in the falsifying of bank notes, securities, etc. Accordingly, in the present invention, an IC card containing data that is difficult to falsify is employed, and a pass word that generally is not disclosed is required to be entered from the operating unit 420 in order to alter the data in the LUT 302. This makes it possible to avoid the danger of falsification.

Figure 13:
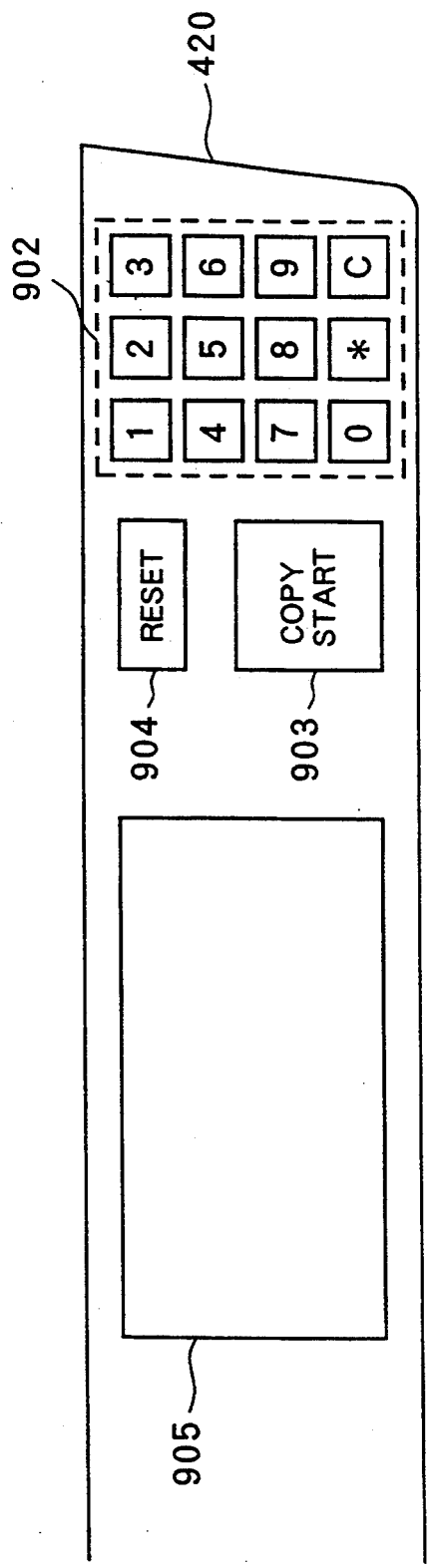
FIG. 13 is a top view showing the control panel of an operating unit.

FIG. 13 is a top view showing the control panel of the operating unit 420 according to the first embodiment. The operating unit 420 is disposed on the front side of the apparatus.

As shown in FIG. 13, the control unit 420 includes a numeric key pad 902, a copy starting key 903 for starting a copying operation, a reset key 904 for initializing various set modes, and a liquid-crystal display unit 905 equipped with a touch panel for setting various modes.

Entry of the pass word is performed by using the numeric key pad 902. More specifically, a pass word desired to be set is entered as follows:

[*][2][0][4][2][9][C][*]

FIG. 14 is a flowchart for describing the procedure for rewriting the color-shade matching LUT 302 according to the first embodiment. The processing of FIG. 14 is executed by the CPU 414, the program whereof is stored in the ROM 415.

First, at step S1001 in FIG. 14, it is determined, based upon a signal from the card reader 228, whether the prescribed IC card has been inserted. If the prescribed IC card has been inserted, the program proceeds to the next step S1002, at which it is determined whether the pass word has been entered by the numeric key pad 902. If the pass word has not been entered correctly, the program returns to the initial step. If the pass word has been entered correctly, then the information in the color-shade matching LUT 302 is updated at step S1003.

Thus, in accordance with the first embodiment as described above, judgment data extracted from read image data is passed through a filter that performs an integrating operation in two dimensions, thereby making it possible to correctly obtain judgment results, which indicate whether an original is a special original or not, without being affected by the direction or orientation of the original image. In addition, by constructing the filter as a so-called two-dimensional IIR filter, two-dimensional noise components in the judgment data are reliably eliminated so that it is possible to correctly obtain judgment results that indicate whether an original is a special original or not.

<Discriminating Circuit> Second Embodiment

The integrating circuits $303_{-1} \sim 303_{-8}$ in the discriminating circuit 409 of FIG. 1 each possess the FIFO memory 508 in order make possible integration in the j direction. However, providing the FIFO memory enlarges the scale of the circuitry and raises cost. The discriminating circuit according to the second embodiment described below is so adapted that the eight integrators share a single FIFO memory.

Figure 15:
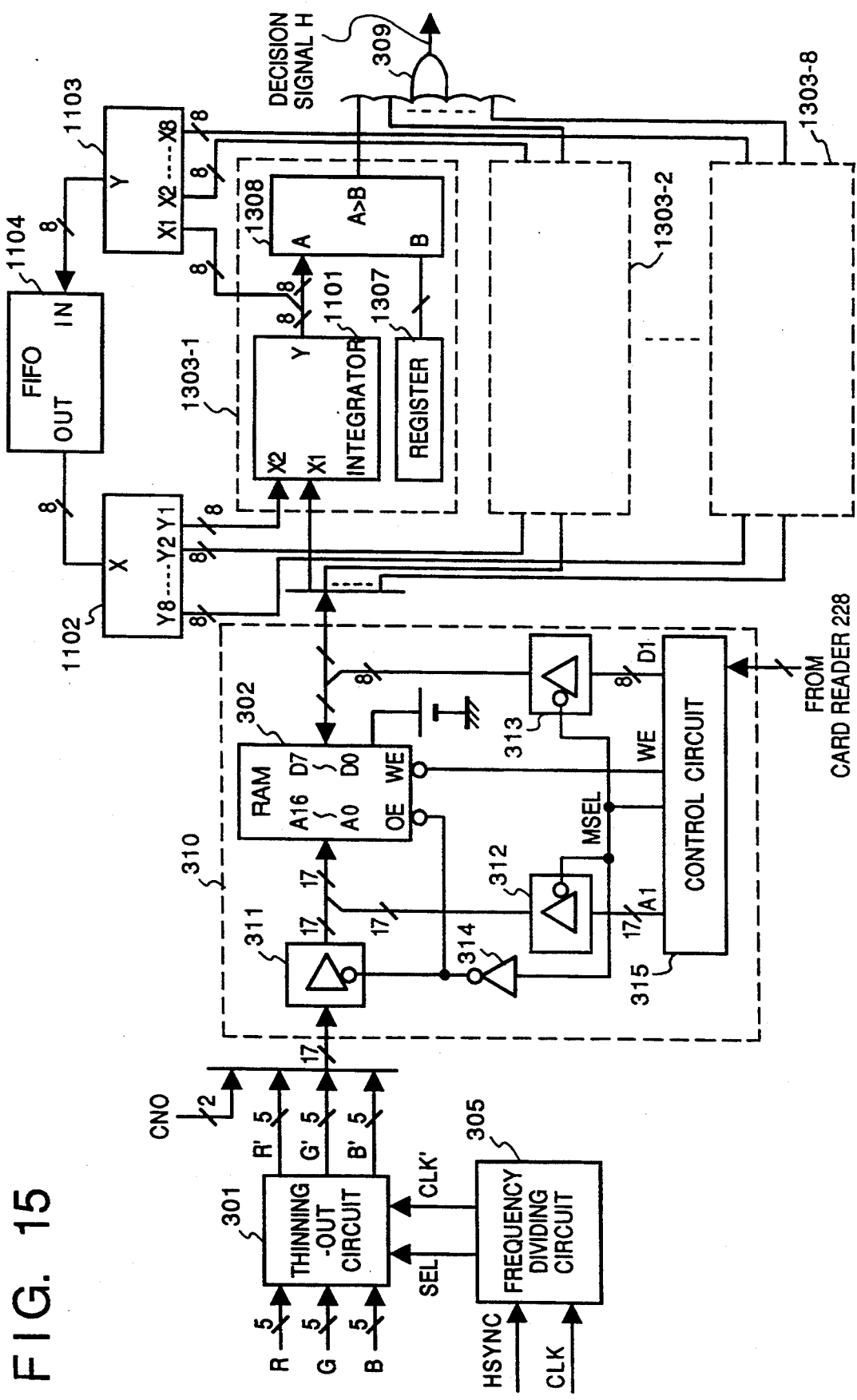
FIG. 15 is a block diagram showing a discriminating circuit according to a second embodiment of the invention.
Figure 16:
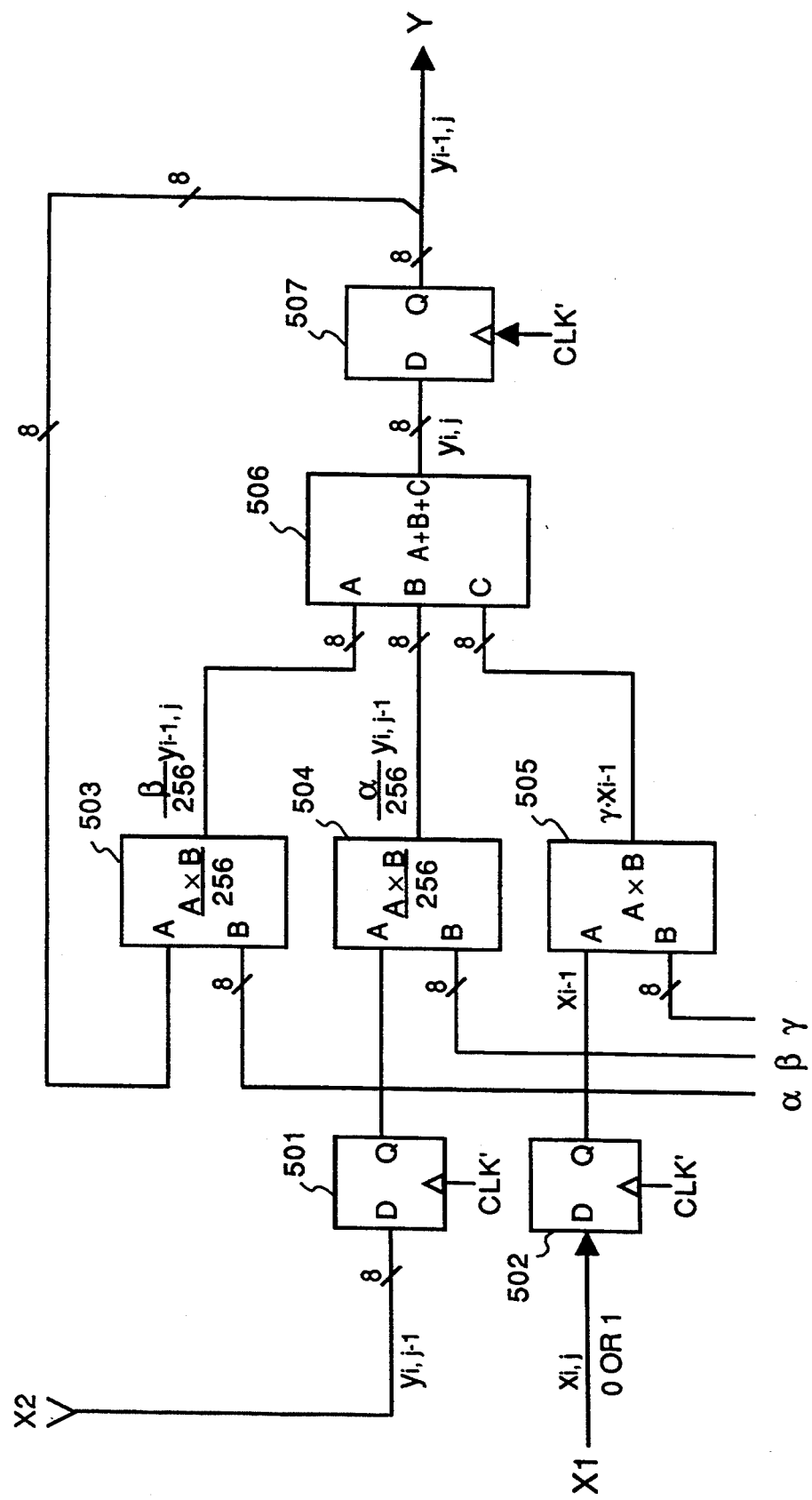
FIG. 16 is a block diagram showing the configuration of an integrator according to a second embodiment of the present invention.

FIG. 15 is a block diagram showing the discriminating circuit according to a second embodiment of the invention, and FIG. 16 is a block diagram showing the configuration of the integrator according to a second embodiment. Elements in FIG. 15 identical with those shown in FIG. 3 are designated by like reference characters and need not be described again.

A comparison of FIGS. 5 and 15 reveals that the discriminating circuit of the second embodiment differs from that of the first embodiment in the construction of the integrator; there is no difference with regard to the thinning-out circuit 301, frequency dividing circuit 305 and color-shade matching circuit 310. More specifically, as shown in FIG. 15, numeral 1101 denotes an integrator corresponding to the integrator 306 (FIG. 5) of the first embodiment. The details of this integrator are shown in FIG. 16. In FIG. 15, numeral 1102 denotes a serial/parallel converter, 1103 a parallel/serial converter, and 1104 a FIFO memory similar to the FIFO memory 508. Further, numerals $1303_{-1} \sim 1303_{-8}$ denote color-shade judging circuits composed of identical hardware. Each circuit comprises the integrator 1101, a register 1307 and a comparator 1308 and each judges whether a special original is contained in an original.

The outputs of the eight integrators 1101 of the eight judging circuits 1303 enter respective $X_1 \sim X_8$ terminals of the parallel/serial converter 1103. The eight items of eight-bit data that enter the converter 1103 as parallel data are converted into eight blocks of successive serial data, in which each block is composed of eight bits. This data enters the FIFO memory 1104, where the data is delayed by one line before being inputted to the serial/parallel converter 1102. The continuous serial data composed of eight blocks (one block=eight bits) outputted by the FIFO memory 1104 enters the X terminal of the converter 1102, which converts this data into eight items of parallel eight-bit data and delivers the converted data to terminals $Y_1 \sim Y_8$. Thus, the single FIFO memory 1104 is capable of being shared by the eight judging circuits.

FIG. 16 illustrates the configuration of the integrator 1101 according to the second embodiment. Since the eight judging circuits ($1303_{-1} \sim 1303_{-8}$) share one FIFO memory, this arrangement differs from that of FIG. 5 in that it does not possess a FIFO memory.

Parallel/Serial Converter 1103

Figure 17:
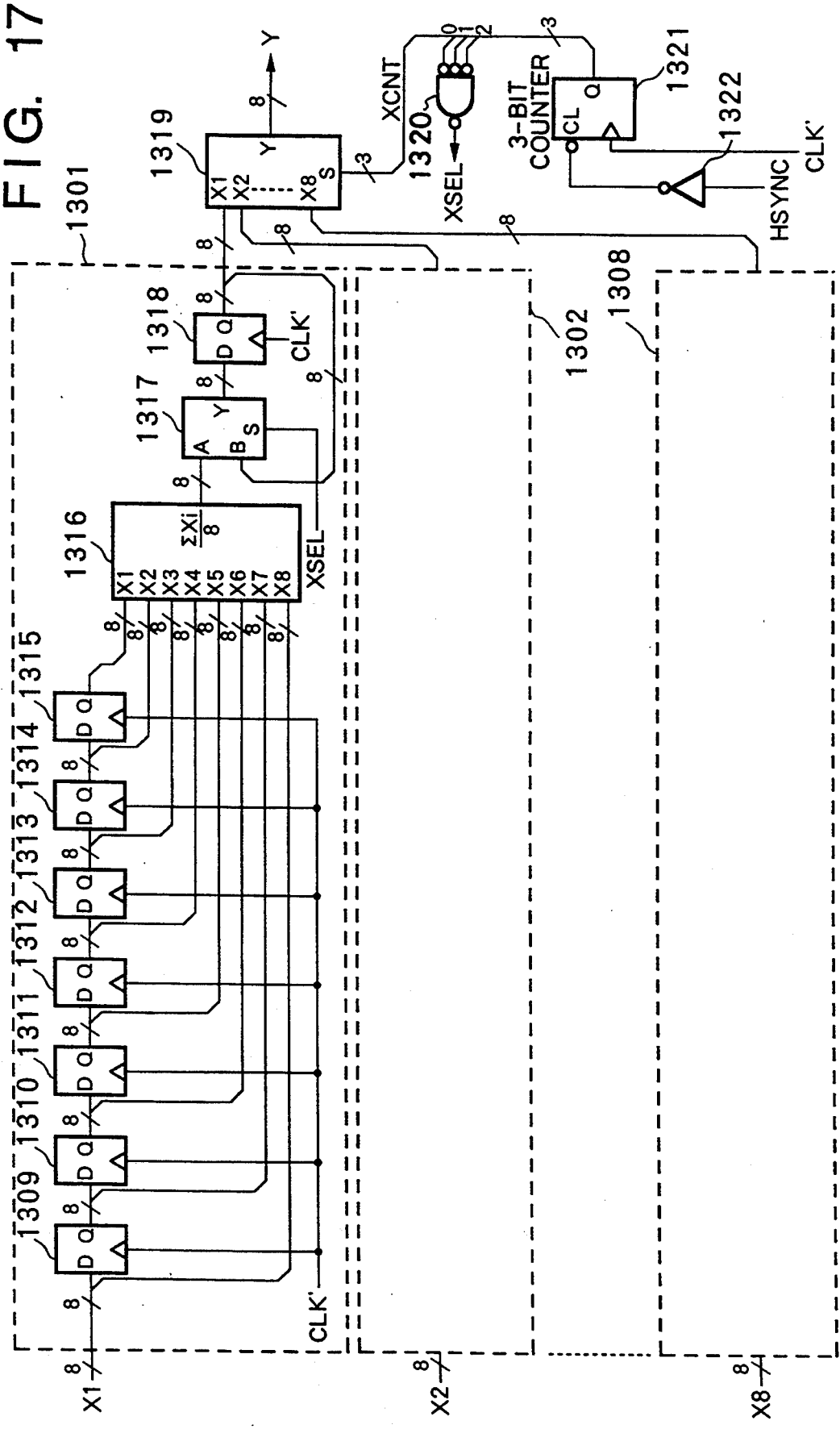
FIG. 17 is a block diagram showing the configuration of a parallel/serial converter according to the second embodiment.

FIG. 17 is a block diagram showing the configuration of the parallel/serial converter 1103 according to the second embodiment. As shown in FIG. 17, the converter 1101 includes an 8-to-1 selector 1319, a three-input OR gate 1320, a three-bit counter 1321, and an inverter 1322. The parallel/serial converter 1103 includes eight mean-value arithmetic circuits (1301, 1302, ..., 1308), which have terminals $X_1 \sim X_8$, respectively, for calculating the mean value of the eight-bit data applied to the respective terminal. Eight-bit data from each of the eight mean-value arithmetic circuits (1301, 1302, ..., 1308) enters the selector 1319 which, in eight operations, successively outputs the eight items of eight-bit data in order.

Each individual mean-value circuit has seven eight-bit latches (1309, 1310, 1311, 1312, 1313, 1314 and 1315), a mean-value circuit 1316, a two-input selector 1317 and an eight-bit latch 1318. The seven eight-bit latches (1309, 1310, 1311, 1312, 1313, 1314 and 1315) latch the input data in synchronism with the leading edge of CLK' thereby subjecting the input data to a delay equivalent to one pulse of CLK'. The mean-value circuit 1316 outputs the mean value ($\Sigma X_i/8$) of the eight inputs at terminals $X_1 \sim X_8$. In effect, this output is the mean value of eight successive input signals. In other words, one mean-value arithmetic circuit 1301 outputs the mean value of the results of judgment regarding one color shade for eight consecutive pixels. The parallel/serial converter 1103 outputs, in order, the mean values (eight bits each) of the results of judging eight types of color shades (of eight consecutive pixels each).

Figure 18:
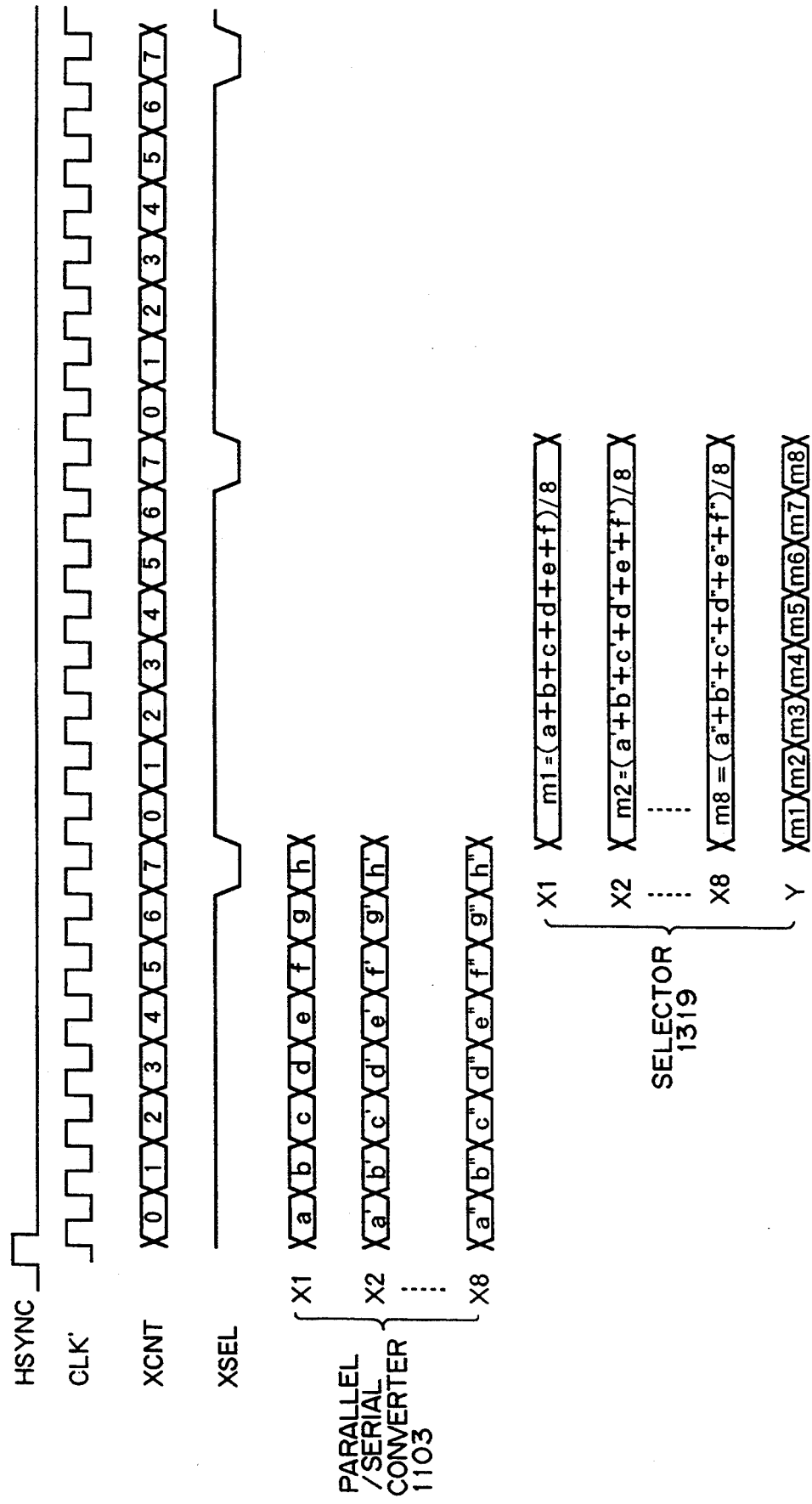
FIG. 18 is an operation timing chart associated with the parallel/serial converter according to the second embodiment.

FIG. 18 is a timing chart showing the operation of the parallel/serial converter 1103.

The three-bit counter 1321 outputs a signal XCNT, which is initialized by the signal HSYNC and synchronized to the leading edge of CLK', repeatedly takes on the values 0, 1, 2, 3, 4, 5, 6, 7. A signal XSEL produced by the gate 1320 becomes "0" only when the signal XCNT is "0" and is "1" at all other times (i.e., when XCNT is not "0"). The mean value of eight consecutive input signals a, b, c, d, e, f that enter the terminal $X_1$ of the parallel/serial converter 1103 is applied to the $X_1$ input terminal of the selector 1319 (FIG. 17) as $m_1$ at the timing illustrated. Similarly, the mean values of the consecutive eight input signals that enter the terminals $X_2 \sim X_8$ of the parallel/serial converter 1103 are applied to the input terminals $X_2 \sim X_8$ of the selector 1319 as $m_2 \sim m_8$. Furthermore, since the signal XCNT enters the control-input terminal S of the selector 1319, the mean values $m_1 \sim m_8$ are outputted in successive fashion, as illustrated in FIG. 18.

Serial/Parallel Converter 1102

Figure 19:
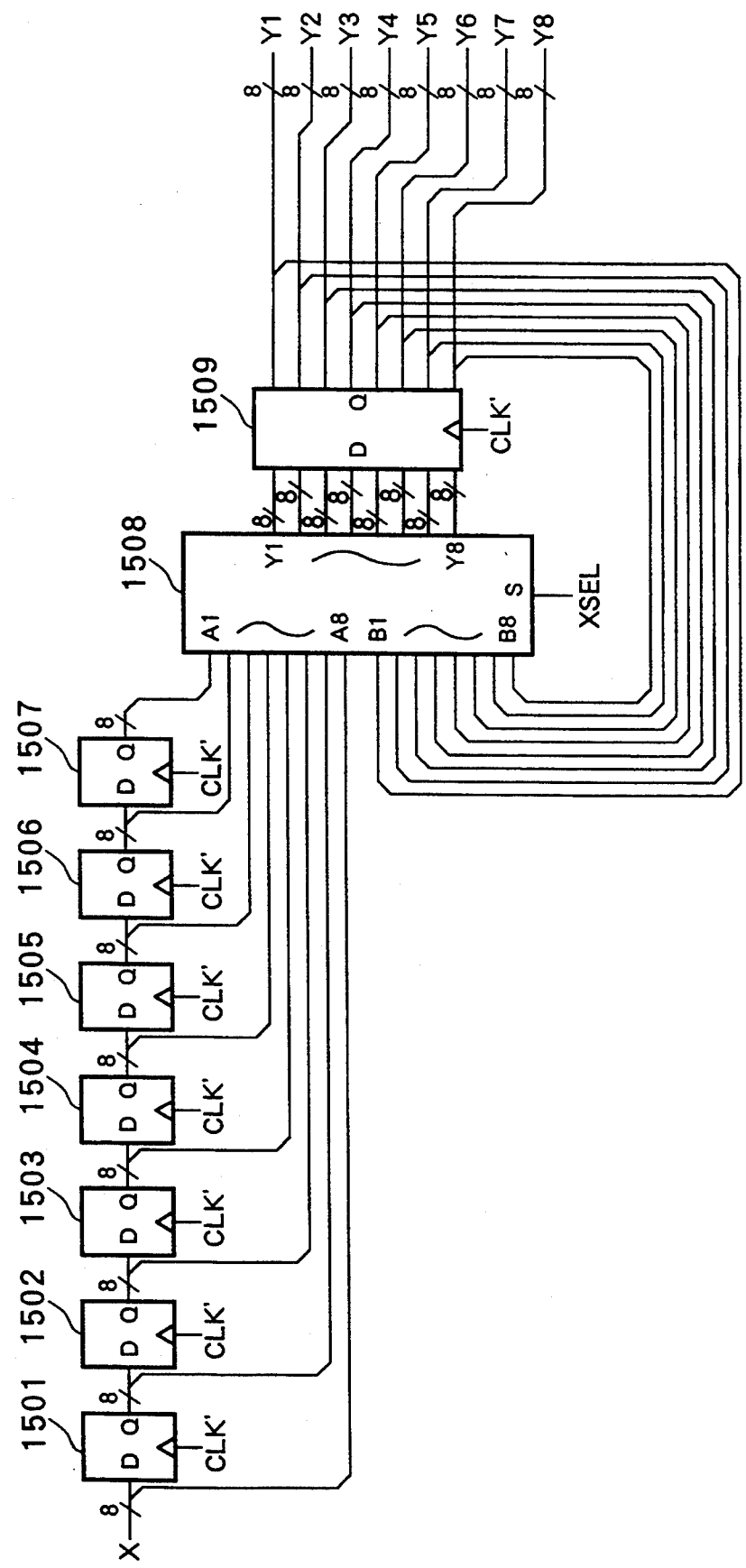
FIG. 19 is a block diagram showing the configuration of a serial/parallel converter according to the second embodiment.

FIG. 19 is a block diagram showing the configuration of the serial/parallel converter 1102 according to the second embodiment. As shown in FIG. 19, the converter 1102 includes seven eight-bit latches (1501, 1502, 1503, 1504, 1505, 1506, 1507 that) latch input data A in synchronism with the leading edge of CLK', thereby subjecting the input data X to a delay equivalent to one pulse of CLK'. Also included are a 2-to-1 selector 1508 and a flip-flop 1509. The signal XSEL is identical with the signal XSEL shown in FIGS. 17 and 18.

Figure 20:
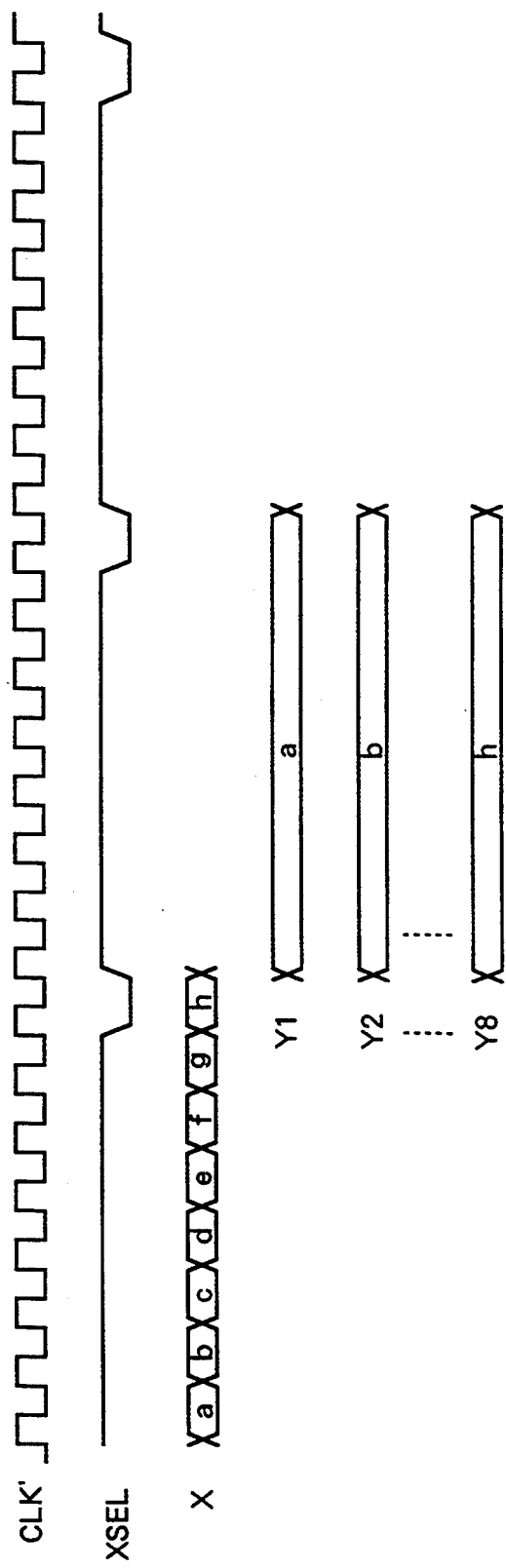
FIG. 20 is an operation timing chart associated with the serial/parallel converter according to the second embodiment.

FIG. 20 is a timing chart showing the operation of the serial/parallel converter 1102.

The serial/parallel converter 1102 synchronizes the eight consecutive inputs a, b, c, d, e, f, g, h to the signal XSEL and outputs the data from terminals $Y_1 \sim Y_8$ in parallel fashion.

Figure 21:
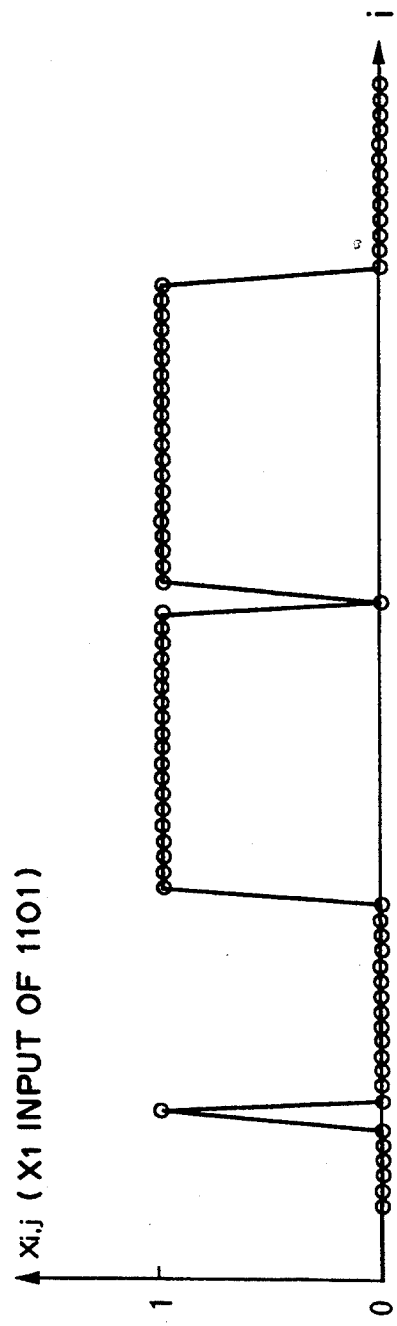
FIG. 21 is a diagram showing the distribution, in i and j directions, of values of an input signal $x_{i,j}$ of the integrator.
Figure 22:
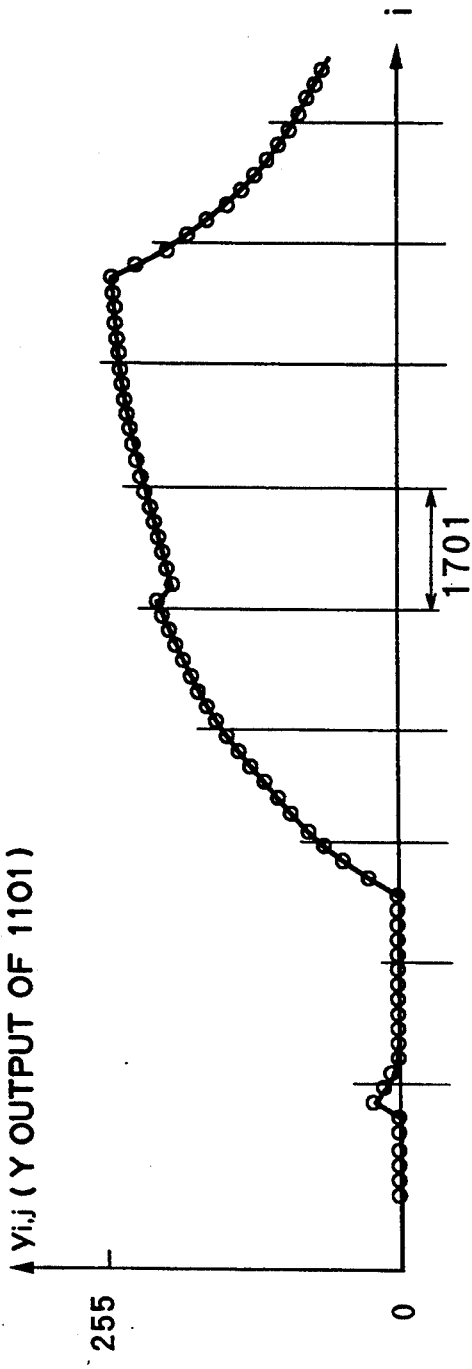
FIG. 22 is a diagram showing the distribution, in i and j directions, of values of an output signal $Y_{i,j}$ of the integrator.
Figure 23:
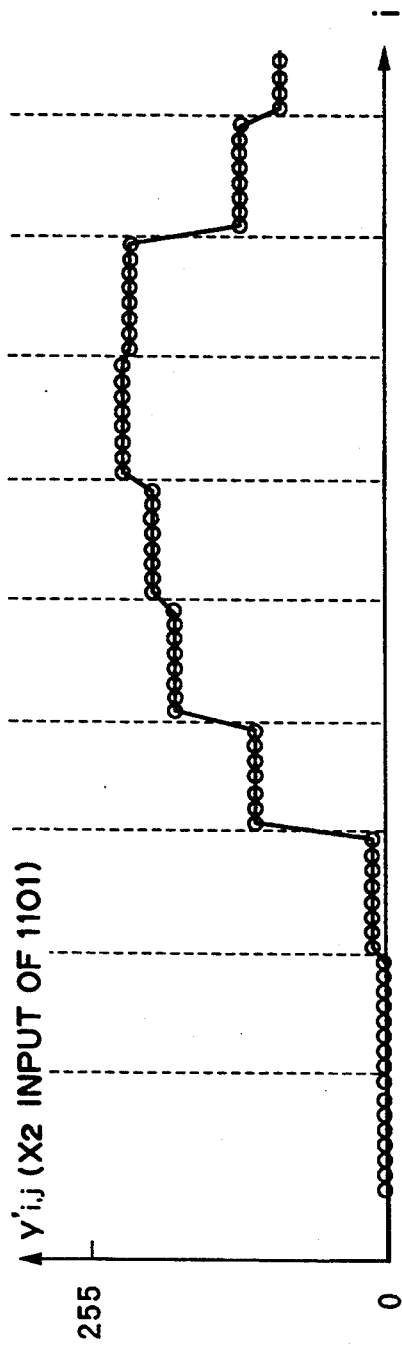
FIG. 23 is a diagram showing the distribution, in i and j directions, of values of a signal $y'_{i,j}$ that enters the integrator from a FIFO memory.

FIGS. 21, 22 and 23 are diagrams for describing, in specific terms, the results of the operation performed by the integrator 1101 according to the second embodiment. FIG. 21 is a diagram showing the input signal $x_{i,j}$ that appears at the $X_1$ terminal of the integrator 1101 (see FIG. 15), FIG. 22 is a diagram showing the output signal $y_{i,j}$ that appears at the Y terminal of the integrator 1101, and FIG. 23 is a diagram showing the feedback input signal $y'_{i,j}$, from the FIFO memory 1104, that appears at the $X_2$ terminal of the integrator 1101.

First, in a case where the binary (one bit) decision signal $x_{i,j}$ (see FIG. 21) enters the terminal $X_1$ of the integrator 1101, $y_{i,j}$ (see FIG. 22) appears at the Y output of the integrator 1101. In the first embodiment described above, the value of $y_{i,j}$ is delayed in the sub-scan direction by the FIFO memory 508 and then enters the integrator 306 again. In the second embodiment, however, the mean value of eight consecutive items of data is delayed by one line in the sub-scanning direction by the FIFO memory 1104 and then enters the $X_2$ terminal of the integrator 1101 as $y'_{i,j}$ (FIG. 23).

Since the output of the integrator 1101 naturally does not possess many high-frequency components, substantially the same output is presented even if the eight consecutive items of data are interchanged for their mean values. As a result, the number of items of data accumulated in the FIFO memory 1104 are thinned to ⅛. By utilizing this, an integrator having a function equivalent to that of the integrator requiring eight FIFO memories in the first embodiment can be constructed using a single FIFO memory.

<Modification>

The present invention can be modified in various ways without departing from the scope of the claims.

For example, though the number of bits constituting the image data is 15 bits for the colors R, B, G in the foregoing embodiments, the number of bits of image data may be selected at will. Though eight color shades are judged in the foregoing embodiment, the invention may be applied to any number of color shades.

Further, in the first embodiment, the integrator is constituted by an IIR filter, but this may be replaced, by an FIR filter.

The present invention is applicable also to an image processing system having a plurality of the image processing apparatus according to the foregoing embodiments. Though the data processing in the foregoing embodiments is executed entirely by hardware, the processing can be executed by a program and the invention covers such a modification.

Further, in each of the foregoing embodiments, a laser-beam printer has been described as an example of the apparatus. However, the invention is not limited to a laser-beam printer but can be applied to an ink-jet printer or thermal-transfer printer as well. In particularly, the invention is applicable to a so-called bubble-jet printer using a head of the type that discharges droplets by means of thermal energy.

In each of the foregoing embodiments, the original image is entered by a reader. However, this does not impose a limitation upon the invention. The invention can be applied to an image entered by a still-video camera or an ordinary video camera or to an image created by a computer graphics technique.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   judging means for judging degree of similarity between entered image data and reference data relating to a special image prepared in advance;
   integrating means for integrating, in two-dimensional space, data indicative of the degree of similarity outputted by said judging means, said integrating means integrating the data by using a recursive filter;
   image processing means for processing the entered image data and for generating processed image data which is used for an image reproduction; and
   control means for controlling said image processing means in accordance with the result obtained by said integrating means.

2. An image processing apparatus comprising:
   judging means for judging degree of similarity between entered image data and reference data relating to a special image prepared in advance;
   integrating means for integrating, in two-dimensional space, data indicative of the degree of similarity outputted by said judging means;
   image processing means for processing the entered image data and for generating processed image data which is used for an image reproduction; and
   control means for controlling said image processing means in accordance with the result obtained by said integrating means,
   wherein said judging means has n-types of reference data and outputs, as one-bit data, results of judging degree of similarity between the entered image data and individual items of the reference data; and
   said integrating means includes:
   n-sets of filtering means;
   a first converting circuit for converting n parallel outputs from said filtering means into serial data;
   delay means for delaying the serial data for a period of time equivalent to one pixel in a sub-scanning direction at entry of the entered image; and
   second converting means for converting serial data outputted by said delay means into n items of parallel data;
   said filtering means including:
   a three-input adder;
   a first multiplier for multiplying the one-bit data, which is indicative of the results of judgment, by a predetermined first gain and inputting the resulting product to a first input of said adder;
   a second multiplier for multiplying an output from said adder by a predetermined second gain and inputting the resulting product to a second input of said adder;
   a circuit for delivering the output of said adder to said first converting means; and
   a third multiplier for multiplying the n items of data from said second converting means by a predetermined third gain and inputting the resulting product to a third input of said adder.

3. The apparatus according to claim 2, wherein said first converting means has n sets of averaging circuits connected to respective outputs of said n sets of filtering means, each of said averaging circuits averaging m filter outputs in a main-scan direction at entry of said entered image.

4. The apparatus according to claim 1, further comprising image forming means for forming an image resulting from processing executed by said image processing means.

5. The apparatus according to claim 1, further comprising input means for inputting the reference data of said special image from an external unit.

6. The apparatus according to claim 5, further comprising: ;
   a data carrier for carrying the reference data of said special image;
   a reading unit for reading the reference data carried on said carrier; and
   a memory for storing the reference data read.

7. An image processing apparatus comprising:
   judging means for judging degree of similarity between entered image data and reference data relating to a special image prepared in advance;
   integrating means for integrating, in two-dimensional space, data indicative of the degree of similarity outputted by said judging means;
   image processing means for processing the entered image data and for generating processed image data which is used for an image reproduction; and
   control means for controlling said image processing means in accordance with the result obtained by said integrating means,
   wherein said integrating means has a two-dimensional infinite impulse-response filter, said filter comprising:
   a three-input adder;
   a first multiplier for multiplying data, which is indicative of the results of judgment, by a predetermined first gain and inputting the resulting product to a first input of said adder;
   a second multiplier for multiplying an output from said adder by a predetermined second gain and inputting the resulting product to a second input of said adder; and
   a third multiplier for multiplying a signal, which is obtained by delaying the output of said adder for a period of time equivalent to one pixel in a sub-scan direction at entry of the entered image, by a predetermined third gain and inputting the resulting product to a third input of said adder.

8. The apparatus according to claim 7, wherein said judging means has n-types of reference data and outputs, as one bit, results of judging degree of similarity between the entered image data and individual items of the reference data;

said integrating means has n-sets of filtering means; and each of said filtering means has said infinite impulse-response filter for integrating the one-bit data, which is indicative of the results of judgment from said judging means, and a comparator for comparing an output from said filter with a predetermined threshold value.

9. An image processing apparatus comprising:

judging means for judging degree of similarity between entered image data and reference data relating to a special image prepared in advance;

integrating means for integrating, in two-dimensional space, data indicative of the degree of similarity outputted by said judging means;

image processing means for processing the entered image data and for generating processed image data which is used for an image reproduction;

control means for controlling said image processing means in accordance with the result obtained by said integrating means;

thinning means for thinning out part of the data from the entered image data, said judging means judging the image data that has been thinned out.

10. An image processing method comprising the steps of:

judging degree of similarity between entered image data and reference data relating to a special image prepared in advance;

integrating, in two-dimensional space, data indicative of the degree of similarity obtained in the judging step, said integrating of the data being made using a recursive filter;

processing the entered image data to generate processed image data which is used for an image reproduction; and controlling processing in said processing step in accordance with the result obtained by said integrating step.

11. An image processing apparatus comprising:

judging means for judging degree of similarity between entered image data and reference data relating to a special image prepared in advance;

integrating means for integrating, in two-dimensional space, data indicative of the degree of similarity outputted by said judging means;

image processing means for processing the entered image data and for generating processed image data which is used for an image reproduction; and control means for controlling said image processing means in accordance with the result obtained by said integrating means, wherein said integrating means is a two-dimensional infinite impulse-response filter.

* * * * *

UNITED STATES PATENT AND TRADEMARK OFFICE
CERTIFICATE OF CORRECTION

PATENT NO. : 5,424,852

DATED : June 13, 1995

INVENTOR(S) : MASAHIRO FUNADA

It is certified that error appears in the above-identified patent and that said Letters Patent is hereby corrected as shown below:

ON TITLE PAGE

In [56] References Cited, under FOREIGN PATENT DOCUMENTS:
"4016707  1/1992  Japan" should read
--4-16707  1/1992  Japan--.

COLUMN 2

Line 64, "$Y_{i,j}$" should read --$y_{i,j}$--.

COLUMN 14

Line 27, "prising:;" should read --prising:--.

Signed and Sealed this

Nineteenth Day of September, 1995

Attest:

BRUCE LEHMAN

Attesting Officer

Commissioner of Patents and Trademarks